(12) United States Patent
Cho

(10) Patent No.: US 10,863,864 B2
(45) Date of Patent: Dec. 15, 2020

(54) WATER AND OIL TYPE FRYER

(71) Applicant: Sang Hoon Cho, Ansan-si (KR)

(72) Inventor: Sang Hoon Cho, Ansan-si (KR)

( * ) Notice: Subject to any disclaimer, the term of this patent is extended or adjusted under 35 U.S.C. 154(b) by 265 days.

(21) Appl. No.: 15/565,160

(22) PCT Filed: May 7, 2015

(86) PCT No.: PCT/KR2015/004549
§ 371 (c)(1),
(2) Date: Oct. 7, 2017

(87) PCT Pub. No.: WO2016/163582
PCT Pub. Date: Oct. 13, 2016

(65) Prior Publication Data
US 2018/0177338 A1 Jun. 28, 2018

(30) Foreign Application Priority Data

Apr. 7, 2015 (KR) .................. 10-2015-0048838

(51) Int. Cl.
*A47J 37/12* (2006.01)

(52) U.S. Cl.
CPC ....... *A47J 37/1242* (2013.01); *A47J 37/1285* (2013.01); *A47J 37/12* (2013.01); *A47J 37/1276* (2013.01)

(58) Field of Classification Search
CPC .... A47J 37/1285; A47J 37/12; A47J 37/1204; A47J 37/1209; A47J 37/1219; A47J 37/1242; A47J 37/1276

USPC .......................................... 99/408, 403, 407
See application file for complete search history.

(56) References Cited

U.S. PATENT DOCUMENTS

| | | | | |
|---|---|---|---|---|
| 6,101,929 A | * | 8/2000 | Saito | A47J 37/1266 126/391.1 |
| 6,736,130 B2 | | 5/2004 | Takahashi | |
| 2005/0252506 A1 | * | 11/2005 | Sato | A47J 37/1271 126/383.1 |
| 2008/0041238 A1 | * | 2/2008 | Usui | A47J 37/1257 99/408 |
| 2009/0101023 A1 | * | 4/2009 | Kimura | A47J 37/1223 99/331 |
| 2014/0208959 A1 | * | 7/2014 | Wakii | A47J 37/1285 99/408 |

FOREIGN PATENT DOCUMENTS

KR 10-1072355 B1 10/2011
KR 10-1214152 B1 12/2012
(Continued)

*Primary Examiner* — Reginald Alexander
(74) *Attorney, Agent, or Firm* — Maschoff Brennan

(57) ABSTRACT

The present invention relates to a water and oil type fryer minimizing the transfer of heat from a layer of oil for frying to a water layer, the water and oil type fryer comprising: an oil cask for frying having a connection pipe having a predetermined cross-sectional area ratio; a gas burner supplying heat to a heating flow path, or an electric heater directly supplying heat to oil for frying; a container for cleaning having a drain pipe, and simultaneously accommodating oil which is connected with oil in the oil cask through the connection pipe, and water which forms a boundary with the oil; and a sediment layer discharge pipe positioned below a boundary surface of oil and water.

14 Claims, 6 Drawing Sheets

(56) References Cited

FOREIGN PATENT DOCUMENTS

| | | |
|---|---|---|
| KR | 10-1214152 B2 | 12/2012 |
| KR | 10-1265764 B1 | 5/2013 |
| KR | 10-1266323 B1 | 5/2013 |
| KR | 10-1266325 B1 | 5/2013 |
| KR | 10-1384763 B1 | 4/2014 |

* cited by examiner

WATER AND OIL TYPE FRYER

TECHNICAL FIELD

The inventive concept relates to a water and oil type fryer, and more particularly, to a water and oil type fryer capable of minimizing transfer of heat from a frying oil layer to a water layer.

BACKGROUND ART

A frying method has a wide range of selecting ingredients such as fish, meat, and vegetables, and is a relatively simple cooking method that is widely used at households or restaurants. Recently, as fast food chains or fried chicken restaurants have rapidly increased, fried food is cooked massively in a specialized way.

Such fried food may be prepared in a relatively simple manner, that is, oil is poured into an oil container and heated, and then, ingredients to be fried are dipped in the oil. A cooking device has been developed from a simple fryer including a tank containing oil for heating the oil and a frying basket, to a water and oil type fryer, in which water and oil are contained together in a frying oil container in order to reduce a consumption amount of oil. In the water and oil type fryer, the water and the frying oil accommodated together in a water and oil frying container are naturally separated from each other into a water layer on a bottom of the frying container and an oil layer above the water layer in the frying container due to a difference between specific gravities thereof. In addition, a heater is located in the oil layer in order to easily heat the frying oil.

When the food is fried by using the water and oil type fryer, fatty acid that is generated when heating the frying oil is dissolved by the water under the frying oil, and residues such as by-products falling off from the fried food are settled toward the water under the frying oil. Thus, contamination of the frying oil due to the fatty acid or the residues may be prevented, and accordingly, the consumption amount of the frying oil may be effectively reduced.

Here, water boils at a temperature of about 100° C. and the frying oil boils at a temperature of about 200° C. or greater. If a temperature of the frying oil is raised to the boiling temperature when the food is fried, the frying oil is burned and becomes unclear, and thus, taste of the fried food is degraded. Accordingly, it is known that the temperature of the frying oil is preferably maintained at about 180° C. while the food is fried. Moreover, since impurities such as the residues generated during the frying process have to be minimized in order to cook the fried food of excellent taste, it is important to maintain the temperature of the frying oil during the frying process and to separate the impurities from the fried food as much as possible.

It is also important to maintain the temperature of water, because the water may mix with the oil and boil over or explode when an upper portion of the water, which contacts the frying oil, is heated by the frying oil. However, the fryer adopting a gas burner for heating the oil includes a heating pipe having an outer side surface that contacts the oil and configured so that the heat generated by the gas burner passes through inside of the heating pipe in order to transfer combustion heat of the gas burner to the oil and heat the oil. Such above heating pipe concentrates only on a function of transferring heat, and thus, the heat is radiated from both an upper portion and a lower portion of the heating pipe so that the heat is also transferred to the water. In a case of using an electronic heater, the same problem as above may occur.

Korean Registered Patent No. 10-1072355 discloses a water and oil fryer, and provides a circulating flow path for circulating the water in the water layer to outside of a water and oil frying container and a technology of removing residues included in the water layer by using a filter device during circulating the water layer. However, the above apparatus has to include an additional device for forcedly circulating the water, and thus, the apparatus has a complicated structure.

Therefore, it needs to develop a water and oil type fryer capable of preventing a temperature of water from rising excessively and removing residues accumulated between the water and the oil layer while maintaining a simple structure of a fryer.

PRIOR ART DOCUMENT

Patent Document

Korean Registered Patent No. 10-1072355

DETAILED DESCRIPTION OF THE INVENTIVE CONCEPT

Technical Problem

The inventive concept provides a water and oil type fryer capable of preventing water from boiling over and removing residues easily without including an additional cooling device or a circulating device.

Technical Solution

According to an aspect of the inventive concept, there is provided a water and oil type fryer including: a frying oil container including an upper surface that is an open horizontal surface and a lower surface comprising an inclined surface of a cone shape and a connection pipe, wherein an end portion at an exit side of the connection pipe forms a horizontal surface and an area of the end portion at the exit side is $1/15$ to $1/20$ of the upper surface; a heat passage provided to penetrate through the frying oil container in order to heat oil in the frying oil container; a gas burner including a metal fiber portion that supplies combustion heat to the heat passage; a cleaning container located under the frying oil container and accommodating the oil and the water simultaneously, and including an upper portion, through which the connection pipe penetrates, wherein a portion contacting the connection pipe is sealed, a lower portion including a drain pipe, and a check window formed between the end portion at the exit side of the connection pipe and a horizontal surface that is 1 cm to 10 cm under the end portion at the exit side of the connection pipe, for indicating an interface between the oil and the water; and an interface deposit discharging pipe disposed between the interface of the oil and the water and a horizontal surface that is 5 cm under the interface so as to discharge a deposit layer at the interface between the oil and the water, wherein the cleaning container includes a protrusion space portion on the upper portion thereof along with one or more sides forming the upper portion of the cleaning container so as to be filled with an air layer when accommodating the oil and the water, and the lower portion of the cleaning container is inclined toward the drain pipe so that the drain pipe is located at a lowermost position, and the heat passage includes a first heating pipe, in which a diffuser plate for diffusing the combustion heat is provided, and a second heating pipe, in which a heat distribution plate is provided.

The metal fiber portion of the gas burner may be inserted into an opening of the first heating pipe toward another opening of the first heating pipe, and the diffuser plate may be provided in the first heating pipe to be spaced apart a predetermined distance from the metal fiber portion, wherein the heat distribution plate may include: a horizontal plate for dividing inside of the second heating pipe into a first flow path located at an upper portion of the heat distribution plate and a second flow path located at a lower portion of the heat distribution plate; a vertical plate dividing the first flow path and the second flow path into left and right portions, and comprising a plurality of openings, each including at least one side in an up-and-down direction, arranged with predetermined intervals; and a plurality of combustion heat guide portions respectively contacting the sides of the openings in the up-and-down direction, and arranged alternately in left and right portions so as to cross the vertical plate at a right angle, wherein the combustion heat guide portions adjacent to opposite end portions of the vertical plate from among the plurality of combustion heat guide portions located in the first flow path and the combustion heat guide portions located in the second flow path may have holes, each having an area that is $4/5$ to $1/3$ of an area of the combustion heat guide portion, and a blocking plate for introducing the combustion heat into the first flow path is coupled to an end portion of the first heating pipe and a sealing plate for introducing the combustion heat that has been introduced into the first flow path to the second flow path is coupled to the other end of the first heating pipe.

The diffuser plate may include: a first diffuser plate provided in the first heating pipe to face the metal fiber portion and to cross a lengthwise direction of the first heating pipe, and comprising a plurality of through holes, wherein the through holes located in an upper half based on a center horizontal line have diameters smaller than diameters of the through holes located in a lower half; and a second diffuser plate spaced apart from the first diffuser plate to cross the lengthwise direction of the first heating pipe, and comprising a plurality of through holes having diameters that are smaller than the diameters of the through holes at corresponding positions in the first diffuser plate, wherein the first diffuser plate and the second diffuser plate may be connected to each other via a connection member, and the connection member may include: a first connection member for connecting a center portion of the first diffuser plate and a center portion of the second diffuser plate to each other; and a second connection member for connecting a partial outer portion of the first diffuser plate and a partial outer portion of the second diffuser plate to each other.

According to an aspect of the inventive concept, there is provided a water and oil type fryer including: a frying oil container including an upper surface that is an open horizontal surface and a lower surface comprising an inclined surface of a cone shape and a connection pipe, wherein an end portion at an exit side of the connection pipe forms a horizontal surface and an area of the end portion at the exit side is $1/15$ to $1/20$ of the upper surface; an electrical heater detachably provided in the frying oil container so as to heat oil in the frying oil container; a cleaning container located under the frying oil container for accommodating the oil and the water simultaneously, and including an upper portion, through which the connection pipe penetrates, wherein a portion contacting the connection pipe is sealed, a lower portion comprising a drain pipe, and a check window formed between the end portion at the exit side of the connection pipe and a horizontal surface that is 1 cm to 10 cm under the end portion at the exit side of the connection pipe, for indicating an interface between the oil and the water; and an interface deposit discharging pipe disposed between the interface of the oil and the water and a horizontal surface that is 5 cm under the interface so as to discharge a deposit layer at the interface between the oil and the water, wherein the cleaning container may include a protrusion space portion on the upper portion thereof along with one or more sides forming the upper portion of the cleaning container so as to be filled with an air layer when accommodating the oil and the water, and the lower portion of the cleaning container is inclined toward the drain pipe so that the drain pipe is located at a lowermost position.

The deposit discharging pipe may include an opening/closing valve, and the check window may be disposed so that the end portion at the exit side of the connection pipe, a surface that is in parallel with the deposit discharging pipe, and an upper surface of the deposit layer formed on the interface between the oil and the water are seen therethrough, and is formed at an end portion of a square pillar that protrudes a predetermined length from a side surface of the cleaning container to be connected to the side surface so as to expand a space in the cleaning container.

An end portion at an entrance side of the connection pipe is in a form of a strip in the lower surface of the frying oil container.

A volume of the protrusion space portion may be $1/20$ to $1/30$ of a volume for accommodating the oil and the water in the cleaning container.

Advantageous Effects

According to a water and oil type fryer of the inventive concept, even when frying oil in an oil container is heated, the heat is transferred to an oil layer that is an upper layer in a cleaning container via a narrow connection pipe, and thus, an amount of heat transferred to an interface between the oil and water may be reduced. Thus, the water may not boil over or may not explode, and additionally, the heat that is wasted may be reduced, and energy supplied to a heat source for heating the frying oil may be reduced. Also, a temperature of the oil layer contacting the water may be maintained to be low in order to prevent a temperature of the water from rising, and a small amount of moist is continuously supplied to the oil layer to prevent the oil from being burned and prevent oil mist from being generated. Therefore, the environment may be improved, and fried food may have a small amount of moist so as to improve texture of the fried food.

MODE OF THE INVENTIVE CONCEPT

Various embodiments will be disclosed with reference to accompanying drawings. In following specification, a plurality of detailed items are disclosed in one or more embodiments for helping one of ordinary skill in the art to understand the inventive concept. However, it should be appreciated that each of the embodiments may be implemented without the above detailed items. One or more embodiments will be described in detail with reference to following descriptions and accompanying drawings. However, this is not intended to limit the inventive concept to particular modes of practice, and it is to be appreciated that all changes, equivalents, and substitutes that do not depart from the spirit and technical scope are encompassed in the inventive concept.

Various embodiments and features will be suggested through a device including a plurality of parts and components. It has to be appreciated that various devices may include additional parts and components, and/or may not include all the parts and components described with reference to accompanying drawings.

Terms such as "embodiment" and "example" used herein should not be interpreted that an embodiment or a design recited herein is superior to or has merits compared to other embodiments or designs.

Moreover, the term "or" is not intended to mean an exclusive "or", but intended to mean a connotative "or". That is, unless otherwise defined or unless contextually clear, the phrase "X uses A or B" may be applied to any of the cases, that is, X uses A; X uses B; or X uses both A and B. Also, the term "and/or" includes any and all combinations of one or more of the associated listed items.

In addition, it is to be understood that the terms such as "including," "having," and "comprising" are intended to indicate the existence of the features, numbers, steps, actions, components, parts, or combinations thereof disclosed in the specification, and are not intended to preclude the possibility that one or more other features, numbers, steps, actions, components, parts, or combinations thereof may exist or may be added. As used herein, the singular forms "a," "an" and "the" are intended to include the plural forms as well, unless the context clearly indicates otherwise.

Figure 1:
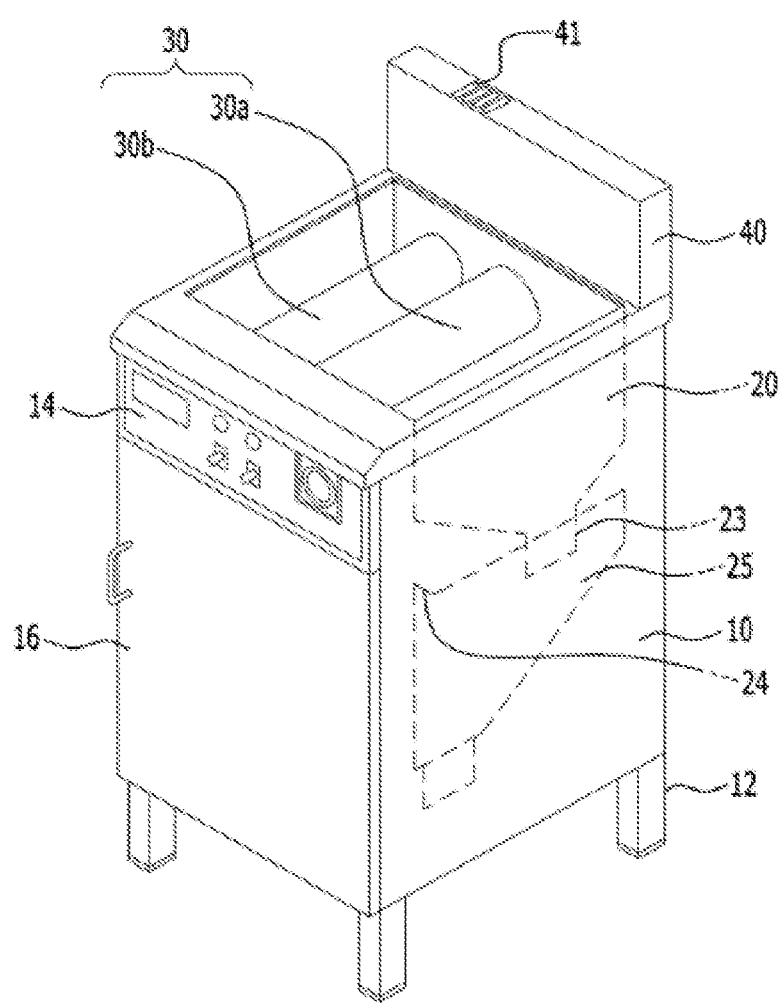
FIG. 1 is an external perspective view of a water and oil type fryer according to the inventive concept.

FIG. 1 is an external perspective view of a water and oil type fryer according to the inventive concept. The water and oil type fryer of FIG. 1 is a gas fryer, and includes a frying oil container 20, in which frying oil is contained, having a connection pipe 23 on a lower portion of the frying oil container 20, a heat passage 30 located in the frying oil container 20 so that an outer surface thereof may contact the frying oil, an exhaust pipe 40 exhausting heat and heated air and including an exhaust passage 41, a manipulation panel 14, a cleaning container 25 accommodating the oil and water simultaneously and having a protrusion space portion on an upper portion thereof, and a housing 10 protecting the above elements and including an opening/closing door 16 and support legs 12. According to an embodiment of the inventive concept, a volume of the space formed with protrusion 24 is about $1/20$ to $1/30$ of a volume for accommodating the oil and water in the cleaning container 25. The space formed with protrusion 24 may be formed along one of corner portions that form sides of an upper surface of the cleaning container 25 and contact side surfaces, and may be formed on the entire corner portions. If the volume of the space formed with protrusion 24 is equal to or greater than $1/20$, it may lack of the oil storage amount, and if the volume of the protrusion portion is equal to or less than $1/30$, it is insufficient to supply air to the oil stored in the space formed with protrusion 24. According to the embodiment of the inventive concept, the heat passage 30 includes a first heating pipe 30a including a diffuser plate for diffusing the combustion heat provided therein, and a second heating pipe 30b including a heat distribution plate provided therein.

Figure 2:
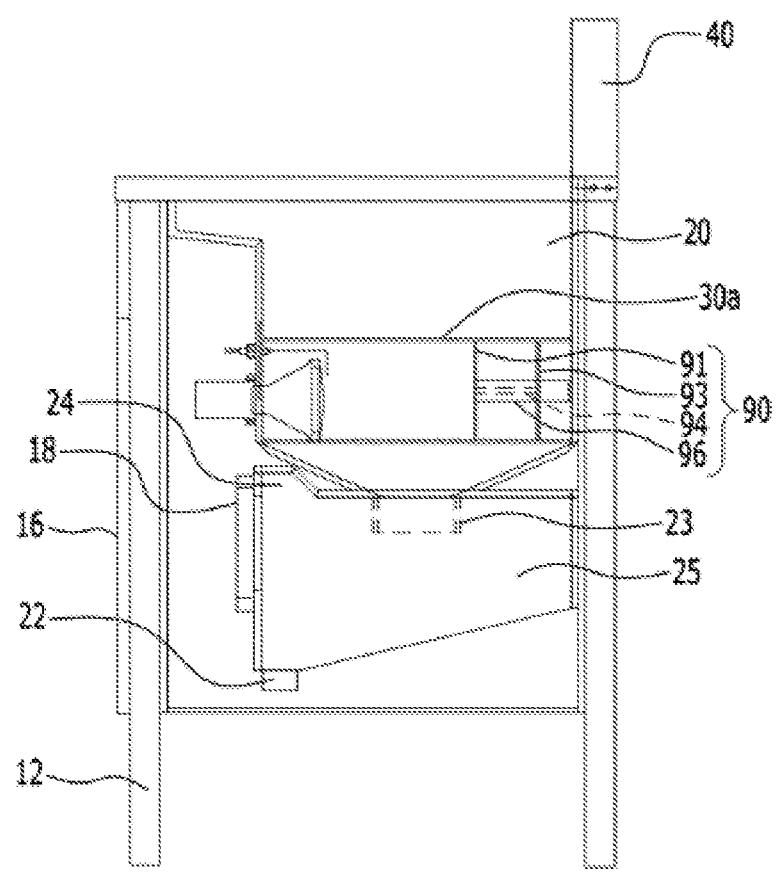
FIG. 2 is a right side view of the water and oil type fryer according to the inventive concept.

FIG. 2 is a right side view of the water and oil type fryer according to the inventive concept, and shows an internal cross-sectional structure. According to the embodiment of the inventive concept, the frying oil container 20 has an upper surface that is an open horizontal surface, a lower surface including an inclined surface of a cone shape, and a connection pipe 23, wherein an end portion at an exit side of the connection pipe 23 forms a horizontal surface and has an area that is about $1/15$ to $1/20$ of the upper surface. In the embodiment of the inventive concept, the area of the end portion at the exit side of the connection pipe 23 is equal to an area of an end portion at an entrance side of the connection pipe 23. If a ratio of a cross-sectional area of the connection pipe with respect to an area of the upper surface is greater than $1/15$, a lot of heat is transferred from the oil container to the cleaning container 25 through the connection pipe 23, and thus, a temperature of the oil contained in the lower cleaning container rises. If the ratio is less than $1/20$, a flow of heat is too slow to form a first cool zone that is a cooling region formed on a lower portion of the heat passage 30. In the embodiment of the inventive concept, the end portion at the entrance side of the connection pipe 23 is in a form of a strip in a lower surface of the frying oil container 20.

According to the embodiment of the inventive concept, in the oil contained in the oil container, the oil located at an upper portion of the heat passage 30 has a temperature of about 180° C., and the oil located at a lower portion of the heat passage 30 has a temperature of about 120° C. Such a difference between the temperatures of the oil is caused by a cooling effect, that is, by a heat exchange with the oil contained in the cleaning container 25 via the connection pipe 23 and a heat exchange between the oil contained in the cleaning container 25 and the water contained in the cleaning container 25, as well as an improvement in a structure of the heat passage according to an embodiment that will be described below.

According to the embodiment of the inventive concept, the heat passage 30 is provided to penetrate through the frying oil container 20 in order to heat the oil in the frying oil container 20. The heat passage 30 includes the first heating pipe 30a, in which a diffuser plate 90 for diffusing the combustion heat is provided, and the second heating pipe 30b, in which the heat distribution plate is provided.

In the embodiment of the inventive concept, the cleaning container 25 accommodates the oil and the water at the same time and is located under the frying oil container 20. In addition, the cleaning container 25 includes an upper surface portion, through which the connection pipe 23 penetrates, wherein a portion contacting the connection pipe is sealed, a lower surface portion including a drain pipe 22, and a check window 18 located between the end portion at the exit side of the connection pipe and a horizontal surface that is 1 to 10 cm under the end portion of the exit side of the connection pipe for indicating an interface between the oil and the water.

According to the embodiment of the inventive concept, the cleaning container 25 includes a protrusion space portion 24 formed on the upper surface portion along with one or more sides forming the upper surface portion so that an air layer 24a is filled when accommodating the oil and the water, and the lower surface portion is inclined toward the drain pipe 22 so that the drain pipe 22 may be located at a lowermost portion.

Figure 3:
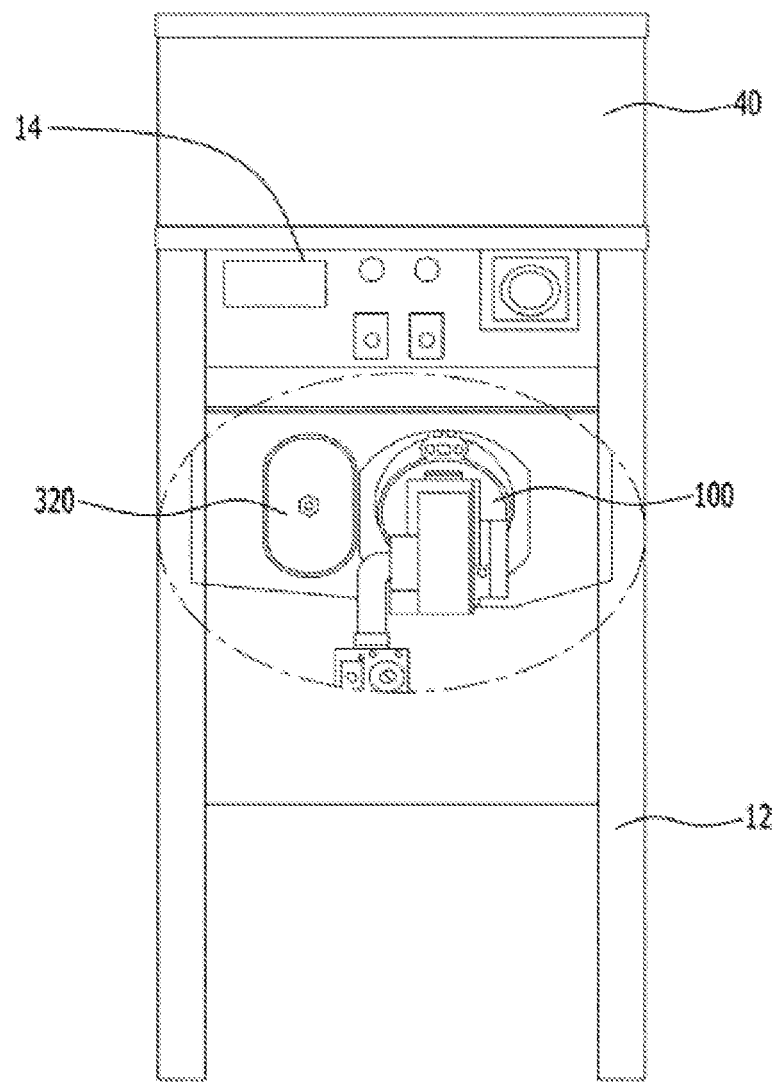
FIG. 3 is an enlarged view of a front surface of the water and oil type fryer and a front surface portion of a frying oil container according to the inventive concept.

FIG. 3 is an enlarged view of a front surface of the water and oil type fryer and a front surface portion of the frying oil container. In the enlarged view, a gas burner 100 having a metal fiber portion that is inserted in the first heating pipe 30a and a sealing plate 320 for sealing the front portion of the second heating pipe 30b are shown in detail. In the embodiment of the inventive concept, the metal fiber portion of the gas burner 100 is inserted into an opening of the first heating pipe 30a toward the other opening, and the diffuser plate 90 is provided in the first heating pipe 30a to be spaced apart a predetermined distance from the metal fiber portion.

Figure 4:
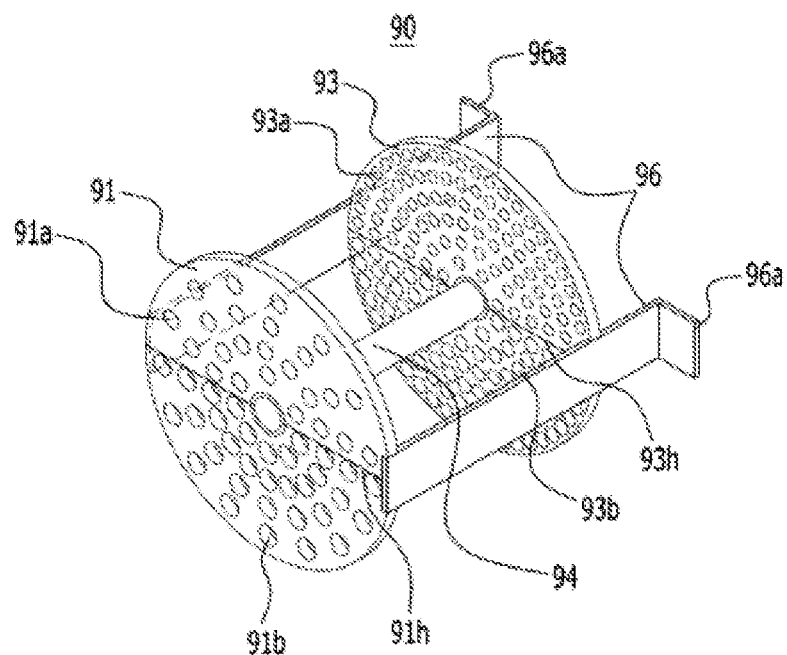
FIG. 4 is a perspective view of a diffuser plate according to the inventive concept.

FIG. 4 is a perspective view of the diffuser plate 90 according to the inventive concept. The diffuser plate 90 includes a first diffuser plate 91 provided in the first heating pipe 30a to face the metal fiber portion and to cross a lengthwise direction of the first heating pipe 30a, and including a plurality of through holes 91a and 91b, wherein the through holes 91a located in an upper portion based on a center horizontal line 91h have diameters that are smaller than the through holes 91b located in a lower portion; and a second diffuser plate 93 provided to be spaced apart from the first diffuser plate 91 and to cross the lengthwise direction of the first heating pipe 30a, and including a plurality of through holes 93a and 93b, wherein the through holes 93a and 93b have diameters that are smaller than those of the through holes 91a and 91b at corresponding locations of the first diffuser plate 91. The first diffuser plate 91 and the second diffuser plate 93 are connected to each other via a connection member, and the connection member includes a first connection member 94 connecting a center portion of the first diffuser plate 91 to a center portion of the second diffuser plate 93; and a second connection member 96 connecting a partial outer portion of the first diffuser plate 91 to a partial outer portion of the second diffuser plate 93. Since the through holes located in the upper portion have smaller diameters, the flow of heat becomes slower, and more heat is transferred to the oil contacting the upper portion of the diffuser plate. In addition, since the through holes located in the lower portion have greater diameters, the flow of heat becomes faster, and thus, less heat is transferred to the oil contacting the lower portion of the diffuser plate. In the embodiment of the inventive concept, the second connection member 96 includes a second connection member supporter 96a that is bent at a location adjacent to the second diffuser plate 93 so as to allow the second connection member 96 to be located on an end portion facing the gas burner of the first heating pipe.

Figure 5:
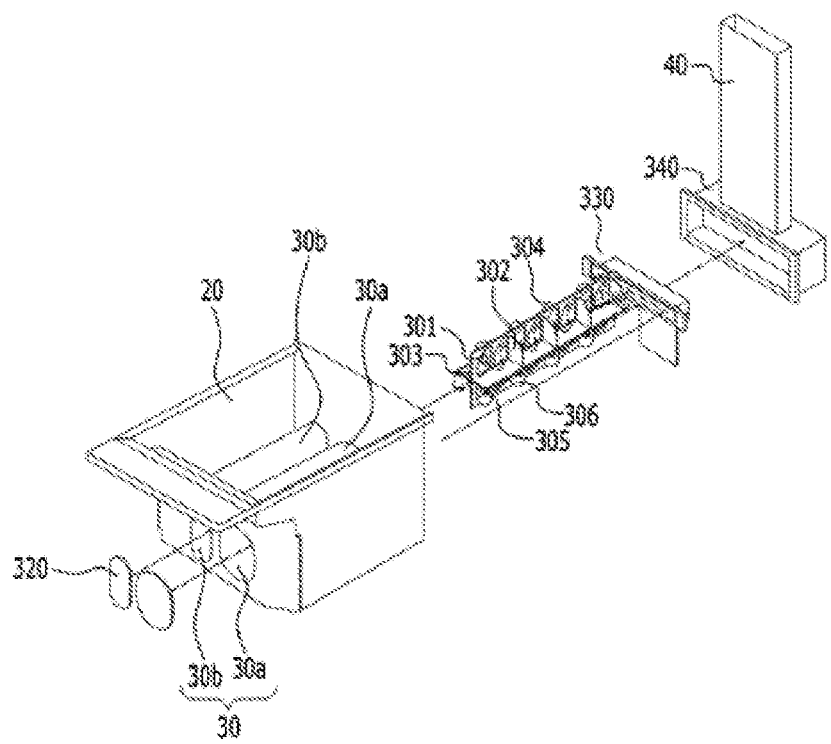

FIG. 5 is an exploded perspective view of an internal structure of the heating pipe for supplying heat to the frying oil container of the water and oil type fryer from the gas burner, and in particular, shows a state where the heat distribution plate provided in the second heating pipe is exposed. When the heat from the gas burner 100 is supplied through a front surface of the first heating pipe 30a, the heat reaches a blocking plate 330 through a rear surface of the first heating pipe 30a. In the blocking plate 330, a lower portion of the blocking plate 330 is blocked so as to make the flow of heat proceed upward, and then, the heat flows from the rear surface of the second heating plate to the front surface through a first flow path located on the heat distribution plate 300. Then, the flow of heat is switched by the sealing plate 320 covering the front surface portion of the second heating pipe to flow from the front surface to the rear surface of the second heating pipe through a second flow path located on a lower portion of the heat distribution plate. The heat reaching the blocking plate 330 may be discharged to outside after passing through the guide plate 340 and the exhaust pipe 40 via an open space.

Figure 6:
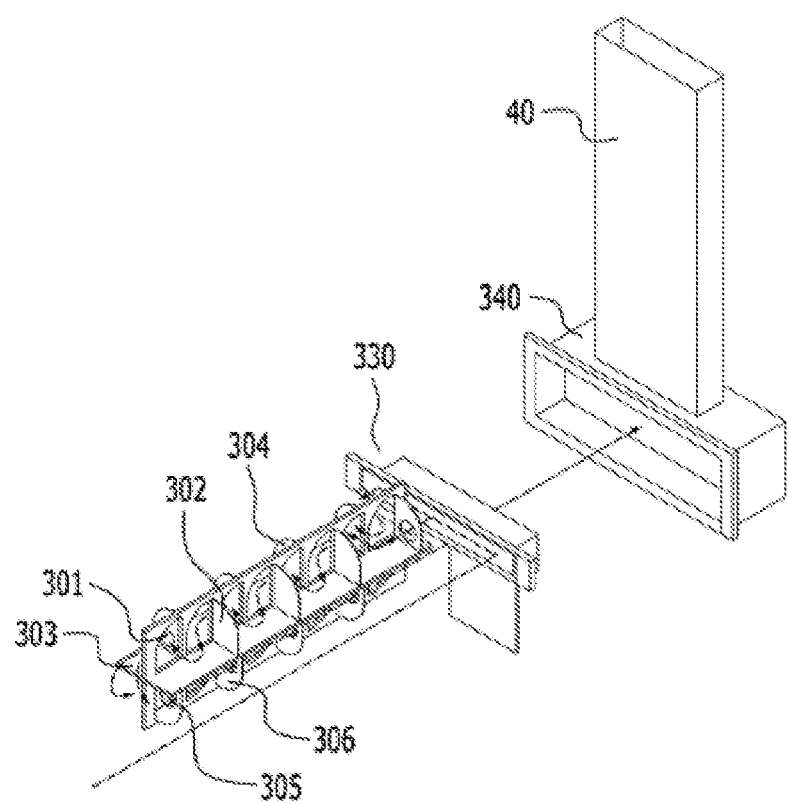
FIG. 6 is a conceptual view showing a detailed structure of a guide portion and a flow of heat according to the inventive concept.

FIG. 6 is a conceptual view showing a detailed structure of a guide portion and a flow of the heat according to the embodiment of the inventive concept. The heat distribution plate includes a horizontal plate 303 dividing the inside of the second heating pipe into the first flow path at the upper portion of the heat distribution plate and the second flow path at the lower portion of the heat distribution plate; a vertical plate dividing the first flow path and the second flow path into left and right portions and including a plurality of openings, each having at least one side in an up-and-down direction, arranged at predetermined intervals; and a plurality of combustion heat guide portions 302, 304, 306, and 308 respectively contacting the sides of the openings in the up-and-down direction and alternately arranged at left and right sides so as to cross the vertical plate at a right angle. In addition, the combustion heat guide portions adjacent to opposite end portions of the vertical plate from among the plurality of combustion heat guide portions 302, 304 and 306 located in the first flow path, and the combustion heat guide portions located in the second flow path include holes 301 and 305, each having an area that is $\frac{4}{5}$ to $\frac{1}{3}$ of an area of the combustion heat guide portion. The blocking plate 330 that introduces the combustion heat to the first flow path is coupled to an end of the second heating pipe, and the sealing plate 320 that introduces the combustion heat that has been introduced in the first flow path to the second flow path is coupled to the other end portion of the second heating pipe. Since the combustion heat guide portions 306 and 308 located in the second flow path have the holes 305, the heat flows fast and less heat is transferred to the oil contacting the second flow path. Since only the combustion heat guide portions located at opposite ends of the first flow path have the holes 301, the heat flow slowly and more heat is transferred to the oil contacting the first flow path.

Figure 7:
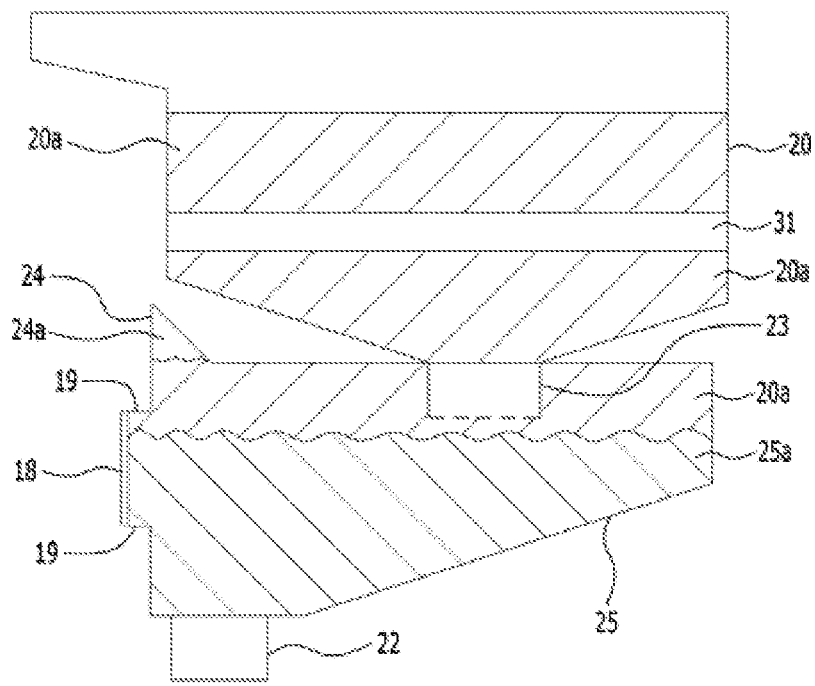
FIG. 7 is a conceptual view showing a state where frying oil and water are filled in the water and oil type fryer according to the inventive concept.

FIG. 7 is a conceptual view showing a state in which frying oil and water are filled in the water and oil type fryer according to the inventive concept. According to the present embodiment of the inventive concept, the water and oil type fryer may include an electrical heater 31 as a heating device. In a case of using the electrical heater 31, the elements such as the heat passage 30 and the exhaust pipe 40 may not be provided, and thus, space availability may be improved. The heating device of FIG. 7 is not limited to the electrical heater, but operations of the water and oil type fryer that may be applied to both the electrical heater 31 and the heat passage 30 including the gas burner 100 will be described below.

Frying oil 20a is accommodated in the frying oil container 20, the connection pipe 23, and the upper portion of the cleaning container 25. Water 25a is contained in a lower portion of the cleaning container 25, and the water 25a is placed under the frying oil 20a while the water 25a and the frying oil 20a form layers due to a difference between specific gravities of the water and the oil. The cleaning container 25 includes the check window 18 and a deposit discharging pipe on a front portion, and the drain pipe 22 on a lower surface of the cleaning container 25. The check window 18 is disposed so that the end portion at the exit side of the connection pipe 23, a surface that is at a horizontal level with the deposit discharging pipe, and an upper surface of a deposit layer formed at an interface between the oil and the water may be seen therethrough, and is formed at an end portion of a square pillar 19 that protrudes a predetermined length from a side surface of the cleaning container 25 in parallel with the side surface so as to expand a space of the cleaning container 25. Due to the square pillar 19 that protrudes a predetermined length in parallel, an accommodation volume of the cleaning container 25 is increased.

When the frying oil 20a is heated by using the gas burner 100 or the electrical heater 31, the temperature of the oil above the heat passage 30 or the electrical heater 31 rises up to 180° C.; however, there is a heat exchange through the oil layer that contacts the water contained in the lower portion of the cleaning container 25 via the connection pipe 23, and thus, the temperature of the oil under the heat passage 30 or the electrical heater 31 is lower than that of the oil at the upper portion, that is, 120° C. In a case of using the gas burner 100, there is a large difference between the thermal transfers of the upper and lower portions of the heat passage 30 because of the structure of the heat passage and the heat distribution plate that are described above according to the inventive concept, and thus, a gas consumption amount is much less than that of the prior art.

Here, since a cross-sectional area of the connection pipe is less than a cross-sectional area of the frying oil container located above the connection pipe, the water may be prevented from boiling over or from exploding even when the water layer and the oil layer contact each other. The area ratio of the connection pipe suggested in the present inventive concept is an optimal ratio that may prevent the water from boiling over while lowering the temperature of the oil. The temperature of the oil layer contacting the water layer in the cleaning container is maintained less than 100° C., e.g., about 50° C., when the area of the end portion at the exit side of the connection pipe is 1/15 to 1/20 of the area of the upper surface of the oil container. As described above, when the temperature of the water is maintained to be low, an amount of water that infiltrates into the oil after being vaporized is restricted, and thus, the ingredients to be fried may not absorb the moist.

The protrusion space portion 24 includes the air layer 24a without being filled with the oil layer, and thus, fresh air may be supplied to the oil layer.

Figure 8:
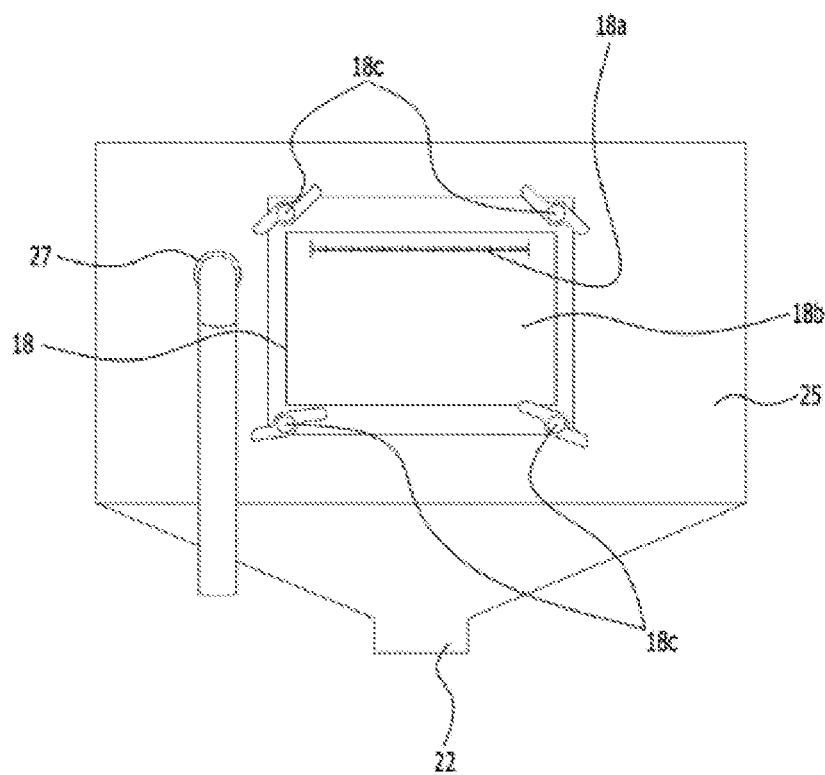
FIG. 8 is a diagram of a front surface portion of a cleaning container in the water and oil type fryer according to the inventive concept.

FIG. 8 is a diagram showing a front surface portion of a cleaning container in a water and oil type fryer according to another embodiment of the inventive concept.

According to the embodiment of the inventive concept, a deposit discharging pipe 27 is formed between the interface 18a of the oil and the water and a horizontal surface that is located 5 cm below than the interface 18a so as to discharge the deposit layer formed at the interface between the oil and the water, and the deposit discharging pipe 27 may include an opening/closing valve. When the oil is heated to raise the temperature of the oil and the ingredients to be fried are put into the oil, animal fat mainly containing saturated fatty acids is heavier than vegetable fat that mainly contains unsaturated fatty acids and is mainly used as frying oil, and thus, the animal fat is accumulated on the interface of the oil 20a, which contacts the water in the cleaning container 25. Also, from among floating materials falling off from the ingredients to be fried, heavy materials reach the bottom of the cleaning container 25, but small and light materials form the deposit layer at the interface between the water and the oil. In order to get rid of the animal fat layer and the deposit layer of the ingredients that are formed directly on the interface between the water and the oil, the deposit discharging pipe 27 is used. The animal fat layer and the deposit layer are discharged through the deposit discharging pipe 27 by opening the opening/closing valve of the deposit discharging pipe 27. An opening/closing portion including a transparent window 18b of the check window 18 may be detached for cleaning and maintenance, and the detaching may be performed by using an O-ring and fixing screws 18c.

Also, when a lot of residues are accumulated in the cleaning container 25, the residues are discharged with the water 25a through the drain pipe 22 in the lower portion of the cleaning container 25. In addition, if the oil is used for a long period and needs to be replaced, the oil may be discharged through the drain pipe 22.

According to the water and oil type fryer of the inventive concept, since the cross-sectional area of the connection pipe that is connected to the oil layer contacting the water is formed to be small, the temperature of the lower portion of the oil is sufficiently low while increasing an energy efficiency. Accordingly, the temperature of the oil layer contacting the water is maintained to be low so as to prevent the temperature of the water from rising and to prevent the moisture from being supplied to the oil layer, and thus, the oil is not burned and oil mist does not generate. Therefore, the environment may be improved and texture of the fried food is improved because the fried food contains only a small amount of moist.

While this inventive concept has been particularly shown and described with reference to preferred embodiments thereof, it will be understood by those skilled in the art that various changes in form and details may be made therein without departing from the spirit and scope of the inventive concept as defined by the appended claims. The preferred embodiments should be considered in descriptive sense only and not for purposes of limitation. Therefore, the scope of the inventive concept is defined not by the detailed description of the inventive concept but by the appended claims, and all differences within the scope will be construed as being included in the inventive concept.

List of Major Reference Numerals

| | |
|---|---|
| 10: housing | 12: support leg |
| 14: manipulation plate | 16: opening/closing door |
| 18: check window | 18a: interface |
| 18b: transparent window | 18c: fixing screw |
| 19: square pillar | |
| 20: frying oil container | 20a: frying oil |
| 22: drain pipe | 23: connection pipe |
| 24: protrusion space portion | 24a: air layer |
| 25: cleaning container | 25a: water |
| 27: deposit discharging pipe | 30: heat passage |
| 30a: first heating pipe | 30b: second heating pipe |
| 31: electrical heater | |
| 40: exhaust pipe | 41: exhaust passage |
| 90: diffuser plate | 91: first diffuser plate |
| 91a, 91b: through holes | 91h: center horizontal line |
| 93: second diffuser plate | 93a, 93b: through holes |
| 93h: center horizontal line | 94: first connection member |
| 96: second connection member | 96a: second connection portion supporter |
| 100: gas burner | |
| 303: horizontal plate | 301, 305: holes |
| 302, 304, 306: combustion heat guide portions | 320: sealing plate |
| 330: blocking plate | 331: lower blocking plate |
| 340: guide plate | |

The invention claimed is:

1. A water and oil type fryer comprising:
a frying oil container comprising an upper surface that is an open horizontal surface and a lower surface comprising an inclined surface of a cone shape and a connection pipe, wherein an end portion at an exit side of the connection pipe forms a horizontal surface and an area of the end portion at the exit side is $\frac{1}{15}$ to $\frac{1}{20}$ of the upper surface;
a heat passage provided to penetrate through the frying oil container in order to heat oil in the frying oil container;
a gas burner comprising a metal fiber portion that supplies combustion heat to the heat passage;
a cleaning container located under the frying oil container and accommodating the oil and the water simultaneously, and comprising an upper portion, through which the connection pipe penetrates, wherein a portion contacting the connection pipe is sealed, a lower portion comprising a drain pipe, and a check window formed between the end portion at the exit side of the connection pipe and a horizontal surface that is 1 cm to 10 cm under the end portion at the exit side of the connection pipe, for indicating an interface between the oil and the water; and
an interface deposit discharging pipe disposed between the interface of the oil and the water and a horizontal surface that is 5 cm under the interface so as to discharge a deposit layer at the interface between the oil and the water,
wherein:
the cleaning container comprises a protrusion space portion on the upper portion thereof along with one or more sides forming the upper portion of the cleaning container so as to be filled with an air layer when accommodating the oil and the water, and the lower portion of the cleaning container is inclined toward the drain pipe so that the drain pipe is located at a lowermost position, and
the heat passage comprises a first heating pipe, in which a diffuser plate for diffusing the combustion heat is provided, and a second heating pipe, in which a heat distribution plate is provided,
the diffuser plate is provided in the first heating pipe to be spaced apart a predetermined distance from the metal fiber portion;
the heat distribution plate comprises:
a horizontal plate for dividing inside of the second heating pipe into a first flow path located at an upper portion of the heat distribution plate and a second flow path located at a lower portion of the heat distribution plate;
a vertical plate dividing the first flow path and the second flow path into left and right portions, and comprising a plurality of openings, each including at least one side in an up-and-down direction, arranged with predetermined intervals; and
a plurality of combustion heat guide portions respectively contacting the sides of the openings in the up-and-down direction, and arranged alternately in left and right portions so as to cross the vertical plate at a right angle;
the combustion heat guide portions adjacent to opposite end portions of the vertical plate from among the plurality of combustion heat guide portions located in the first flow path and the combustion heat guide portions located in the second flow path have holes, each having an area that is $\frac{4}{5}$ to $\frac{1}{3}$ of an area of the combustion heat guide portion; and
a blocking plate for introducing the combustion heat into the first flow path is coupled to an end portion of the first heating pipe and a sealing plate for introducing the combustion heat that has been introduced into the first flow path to the second flow path is coupled to the other end of the first heating pipe.

2. The water and oil type fryer of claim 1, wherein:
the diffuser plate comprises:
a first diffuser plate provided in the first heating pipe to face the metal fiber portion and to cross a lengthwise direction of the first heating pipe, and comprising a plurality of through holes, wherein the through holes located in an upper half based on a center horizontal line have diameters smaller than diameters of the through holes located in a lower half; and
a second diffuser plate spaced apart from the first diffuser plate to cross the lengthwise direction of the first heating pipe, and comprising a plurality of through holes having diameters that are smaller than the diameters of the through holes at corresponding positions in the first diffuser plate;
the first diffuser plate and the second diffuser plate are connected to each other via a connection member; and
the connection member comprises:
a first connection member for connecting a center portion of the first diffuser plate and a center portion of the second diffuser plate to each other; and
a second connection member for connecting a partial outer portion of the first diffuser plate and a partial outer portion of the second diffuser plate to each other.

3. The water and oil type fryer according to claim 1, wherein an end portion at an entrance side of the connection pipe is formed as a strip in the lower surface of the frying oil container.

4. The water and oil type fryer according to claim 1, wherein a volume of the protrusion space portion is $\frac{1}{20}$ to $\frac{1}{30}$ of a volume for accommodating the oil and the water in the cleaning container.

5. The water and oil type fryer according to claim 1, wherein:
the deposit discharging pipe comprises an opening/closing valve, and
the check window is disposed so that the end portion at the exit side of the connection pipe, a surface that is in parallel with the deposit discharging pipe, and an upper surface of the deposit layer formed on the interface between the oil and the water are seen therethrough, and is formed at an end portion of a square pillar that protrudes a predetermined length from a side surface of the cleaning container to be connected to the side surface so as to expand a space in the cleaning container.

6. The water and oil type fryer according to claim 2, wherein:
the deposit discharging pipe comprises an opening/closing valve, and
the check window is disposed so that the end portion at the exit side of the connection pipe, a surface that is in parallel with the deposit discharging pipe, and an upper surface of the deposit layer formed on the interface between the oil and the water are seen therethrough, and is formed at an end portion of a square pillar that protrudes a predetermined length from a side surface of the cleaning container to be connected to the side surface so as to expand a space in the cleaning container.

7. The water and oil type fryer according to claim 1, wherein an end portion at an entrance side of the connection pipe is formed as a strip in the lower surface of the frying oil container.

8. The water and oil type fryer according to claim 2, wherein an end portion at an entrance side of the connection pipe is formed as a strip in the lower surface of the frying oil container.

9. The water and oil type fryer according to claim 1, wherein a volume of the protrusion space portion is $\frac{1}{20}$ to $\frac{1}{30}$ of a volume for accommodating the oil and the water in the cleaning container.

10. The water and oil type fryer according to claim 2, wherein a volume of the protrusion space portion is $\frac{1}{20}$ to $\frac{1}{30}$ of a volume for accommodating the oil and the water in the cleaning container.

11. A water and oil type fryer comprising:
   a frying oil container comprising an upper surface that is an open horizontal surface and a lower surface comprising an inclined surface of a cone shape and a connection pipe, wherein an end portion at an exit side of the connection pipe forms a horizontal surface and an area of the end portion at the exit side is $\frac{1}{15}$ to $\frac{1}{20}$ of the upper surface;
   an electrical heater detachably provided in the frying oil container so as to heat oil in the frying oil container;
   a cleaning container located under the frying oil container for accommodating the oil and the water simultaneously, and comprising an upper portion, through which the connection pipe penetrates, wherein a portion contacting the connection pipe is sealed, a lower portion comprising a drain pipe, and a check window formed between the end portion at the exit side of the connection pipe and a horizontal surface that is 1 cm to 10 cm under the end portion at the exit side of the connection pipe, for indicating an interface between the oil and the water; and
   an interface deposit discharging pipe disposed between the interface of the oil and the water and a horizontal surface that is 5 cm under the interface so as to discharge a deposit layer at the interface between the oil and the water, wherein:
   the cleaning container comprises a protrusion space portion on the upper portion thereof along with one or more sides forming the upper portion of the cleaning container so as to be filled with an air layer when accommodating the oil and the water, and the lower portion of the cleaning container is inclined toward the drain pipe so that the drain pipe is located at a lowermost position,
   the deposit discharging pipe comprises an opening/closing valve, and
   the check window is disposed so that the end portion at the exit side of the connection pipe, a surface that is in parallel with the deposit discharging pipe, and an upper surface of the deposit layer formed on the interface between the oil and the water are seen therethrough, and is formed at an end portion of a square pillar that protrudes a predetermined length from a side surface of the cleaning container to be connected to the side surface so as to expand a space in the cleaning container.

12. The water and oil type fryer according to claim 11, wherein:
   the deposit discharging pipe comprises an opening/closing valve, and
   the check window is disposed so that the end portion at the exit side of the connection pipe, a surface that is in parallel with the deposit discharging pipe, and an upper surface of the deposit layer formed on the interface between the oil and the water are seen therethrough, and is formed at an end portion of a square pillar that protrudes a predetermined length from a side surface of the cleaning container to be connected to the side surface so as to expand a space in the cleaning container.

13. The water and oil type fryer according to claim 11, wherein an end portion at an entrance side of the connection pipe is formed as a strip in the lower surface of the frying oil container.

14. The water and oil type fryer according to claim 11, wherein a volume of the protrusion space portion is $\frac{1}{20}$ to $\frac{1}{30}$ of a volume for accommodating the oil and the water in the cleaning container.

* * * * *